US008683567B2

(12) United States Patent
Kim et al.

(10) Patent No.: US 8,683,567 B2
(45) Date of Patent: Mar. 25, 2014

(54) METHOD OF DISTRIBUTING INFORMATION REGARDING ONE OR MORE ELECTRICAL DEVICES AND SYSTEM FOR THE SAME

(75) Inventors: Ryan Yong Kim, Torrance, CA (US); Naga Yerramsetti, Houston, TX (US); Ricardo Federico Maurino, El Segundo, CA (US)

(73) Assignee: Belkin International, Inc., Playa Vista, CA (US)

( * ) Notice: Subject to any disclaimer, the term of this patent is extended or adjusted under 35 U.S.C. 154(b) by 346 days.

(21) Appl. No.: 13/077,782

(22) Filed: Mar. 31, 2011

(65) Prior Publication Data

US 2012/0254961 A1 Oct. 4, 2012

(51) Int. Cl.
 *G06F 15/177* (2006.01)
 *G06F 7/04* (2006.01)

(52) U.S. Cl.
 USPC .................................. 726/7; 709/220; 726/3

(58) Field of Classification Search
 USPC .............................. 726/22–25, 3, 7; 709/220
 See application file for complete search history.

(56) References Cited

U.S. PATENT DOCUMENTS

| | | | |
|---|---|---|---|
| 6,408,339 B1 | 6/2002 | Wirkestrand | |
| 6,523,696 B1 | 2/2003 | Saito et al. | |
| 6,686,838 B1 | 2/2004 | Rezvani et al. | |
| 6,943,681 B2 | 9/2005 | Rezvani et al. | |
| 6,957,275 B1 | 10/2005 | Sekiguchi | |
| 7,032,002 B1 | 4/2006 | Rezvani et al. | |
| 7,250,854 B2 | 7/2007 | Rezvani et al. | |
| 7,555,528 B2 | 6/2009 | Rezvani et al. | |
| 7,634,555 B1 | 12/2009 | Kumor | |
| 7,664,096 B2 * | 2/2010 | Doherty et al. | 370/352 |
| 7,796,023 B2 | 9/2010 | Rezvani et al. | |
| 8,295,268 B2 * | 10/2012 | Tanaka et al. | 370/351 |
| 2002/0010767 A1 | 1/2002 | Farrow | |
| 2002/0040397 A1 | 4/2002 | Choi | |
| 2002/0052876 A1 | 5/2002 | Waters | |
| 2002/0133573 A1 | 9/2002 | Matsuda | |
| 2003/0145073 A1 | 7/2003 | Lee | |
| 2004/0015712 A1 * | 1/2004 | Szor | 713/200 |
| 2004/0024879 A1 | 2/2004 | Dingman et al. | |

(Continued)

FOREIGN PATENT DOCUMENTS

JP 2000101589 A 4/2000

OTHER PUBLICATIONS

International Search Report dated Sep. 25, 2012.

*Primary Examiner* — Aravind Moorthy
*Assistant Examiner* — Shu Chun Gao
(74) *Attorney, Agent, or Firm* — Bryan Cave LLP

(57) ABSTRACT

Some embodiments of a method can include: receiving in a first server a first request to register a first electrical device storing in the first server the unique identification information, the internal IP address, and the external IP address of the first electrical device receiving in the first server a first request for information regarding the first electrical device; using the first server to determine the external IP address of the first electrical device; redirecting the first request for the information to a first gateway device if an external IP address of a first client computer is identical to the external IP address of the first electrical device; and returning the external IP address of the first electrical device if the external IP address of the first client computer is different from the external IP address of the first electrical device. Other embodiments are disclosed.

13 Claims, 11 Drawing Sheets

(56) References Cited

U.S. PATENT DOCUMENTS

| | | |
|---|---|---|
| 2004/0249975 A1 | 12/2004 | Singh |
| 2005/0286519 A1 | 12/2005 | Ravikumar et al. |
| 2007/0214232 A1 | 9/2007 | Belimpasakis et al. |
| 2008/0082640 A1 | 4/2008 | Zhao |
| 2010/0077023 A1 | 3/2010 | Eriksson |
| 2010/0107252 A1* | 4/2010 | Mertoguno ............... 726/23 |
| 2011/0050410 A1 | 3/2011 | Rezvani et al. |
| 2011/0209219 A1* | 8/2011 | Zeitlin et al. ............. 726/23 |

* cited by examiner

METHOD OF DISTRIBUTING INFORMATION REGARDING ONE OR MORE ELECTRICAL DEVICES AND SYSTEM FOR THE SAME

FIELD OF THE INVENTION

This invention relates generally to systems and method to provide information, and relates more particularly to systems configured to provide information regarding electrical devices and methods for the same.

DESCRIPTION OF THE BACKGROUND

In today's widely used IP (internet protocol) networks, the Dynamic Host Configuration Protocol (DHCP) is commonly used to dynamically assign an IP address to an electrical device coupled to a network. DHCP is a useful and convenient mechanism that allows new electrical devices to connect to a network without manual configuration. Although DHCP allows the assignment of a dynamic IP address to an electrical device, no convenient method exists for other electrical devices or users to determine the new dynamically assigned IP address of the electrical device. Because the IP address has been dynamically assigned, the IP address can change every time the electrical device is plugged into the network, removed, and plugged in again so the dynamically assigned IP address of the electrical device may need to be repeatedly determined.

Many methods to retrieve the dynamically assigned IP address involve using proprietary visual user interfaces of the electrical device or a gateway device. For example, if the electrical device has a visual display capability (e.g., laptops, mobile phones, printers with an LCD display, game consoles coupled to a television, etc.), a proprietary method of navigating a visual user interface usually exists to allow the user to determine the new dynamically assigned IP address.

In the same or different examples, the router or other gateway device that hosts the DHCP server can have a proprietary visual user interface that allows the user to navigate a series of screens, menu items, and/or commands to determine the newly assigned dynamic IP address for the electrical device. However, in this method, the user is required to know the MAC (media access control, or hardware) address of the electrical device and then look up the MAC address in a table to find the associated dynamically assigned IP address.

Furthermore, standard and widely adopted protocols such as UPnP (universal plug and play), DLNA (digital living network alliance), and Bonjour work in the application layer above TCP/IP (transmission control protocol/internet protocol) and allow for dynamic discovery of new electrical devices provided that those new electrical devices also participate in and support the proprietary discovery protocol. However, these protocols are generally only useful within a local private network. If the proprietary discovery protocol works in both private and public networks, the proprietary discovery protocol requires the user to enter two different addresses to access the electrical device depending on whether the user is inside or outside of the local network.

Accordingly, a need or potential for benefit exists for a method and/or system that allow a user to discover easily a dynamically assigned IP address for an electrical device and to access and use the electrical device without knowing the DHCP address.

BRIEF DESCRIPTION OF THE DRAWINGS

To facilitate further description of the embodiments, the following drawings are provided in which.

Figure 1:
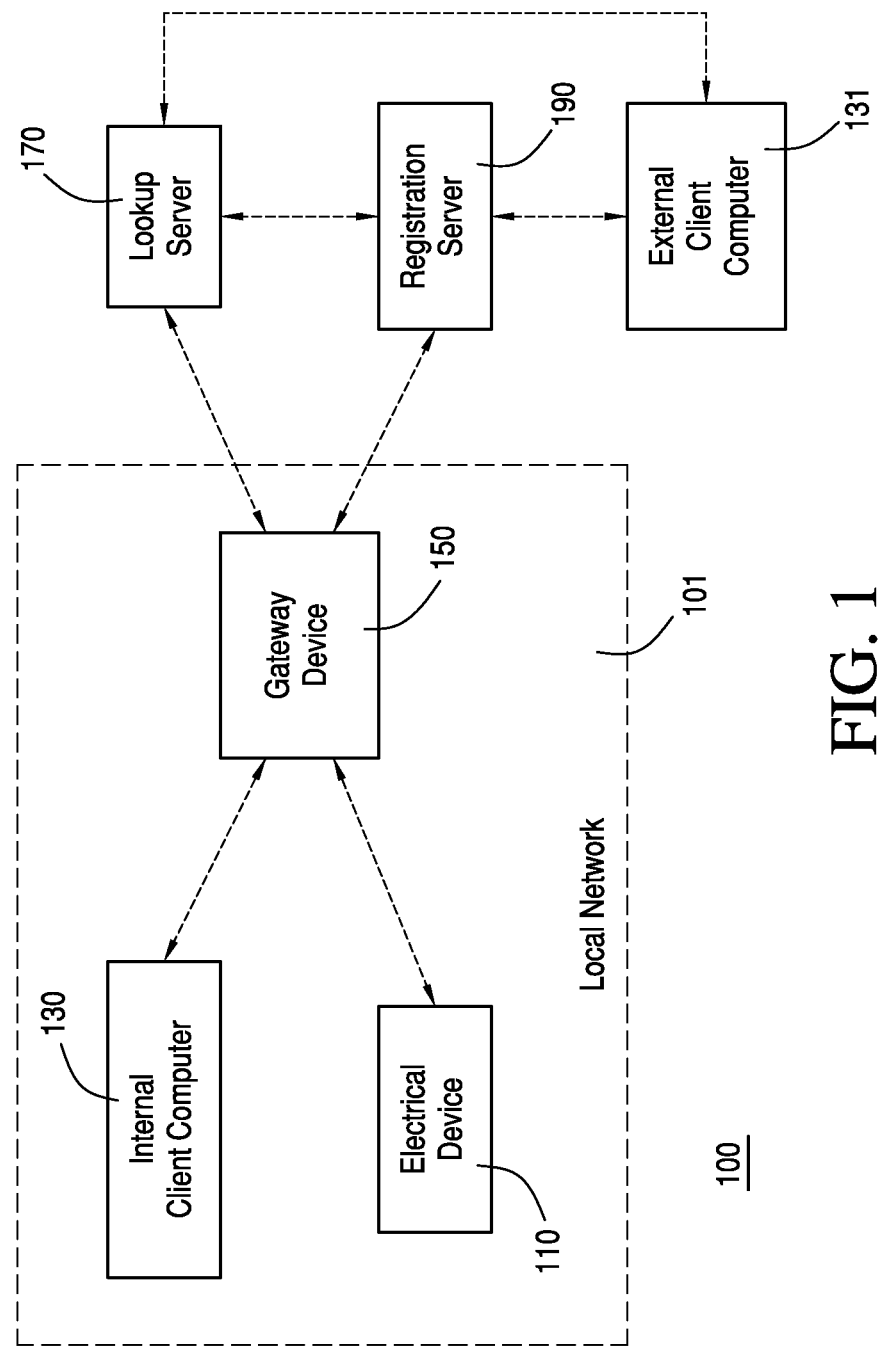
FIG. 1 illustrates a block diagram of a system configured to provide information regarding at least one electrical device, according to a first embodiment.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein.

The terms "couple," "coupled," "couples," "coupling," and the like should be broadly understood and refer to connecting two or more elements or signals, electrically, mechanically and/or otherwise. Two or more electrical elements may be electrically coupled but not be mechanically or otherwise coupled; two or more mechanical elements may be mechanically coupled, but not be electrically or otherwise coupled; two or more electrical elements may be mechanically coupled, but not be electrically or otherwise coupled. Coupling may be for any length of time, e.g., permanent or semi-permanent or only for an instant.

"Electrical coupling" and the like should be broadly understood and include coupling involving any electrical signal, whether a power signal, a data signal, and/or other types or combinations of electrical signals. "Mechanical coupling" and the like should be broadly understood and include mechanical coupling of all types.

The absence of the word "removably," "removable," and the like near the word "coupled" and the like does not mean that the coupling, etc. in question is or is not removable.

DETAILED DESCRIPTION OF EXAMPLES OF EMBODIMENTS

Some embodiments concern a method of distributing information regarding one or more electrical devices using a first server. Each of the one or more electrical devices can have unique identification information, an internal IP address, and an external IP address. The method can include: receiving in the first server a first request to register a first electrical device of the one or more electrical devices, the first request to register comprises the unique identification information, the internal IP address, and the external IP address of the first electrical device of the one or more electrical devices; storing in the first server the unique identification information, the internal IP address, and the external IP address of the first electrical device of the one or more electrical devices using the first server; receiving in the first server from a first client computer a first request for information regarding the first electrical device of the one or more electrical devices; using the first server to determine the external IP address of the first electrical device of the one or more electrical devices; redirecting the first request for the information to a first gateway device if an external IP address of the first client computer is identical to the external IP address of the first electrical device of the one or more electrical devices; and returning the external IP address of the first electrical device of the one or more electrical devices if the external IP address of the first client computer is different from the external IP address of the first electrical device of the one or more electrical devices Various embodiments can concern a method of disseminating information regarding at least one electrical device using a registration server. The at least one electrical device has unique identification information, an internal IP address, and an external IP address wherein the external IP address is an IP address of a first gateway device for a first local network. The method can include: receiving in the registration server a first request to register the at least one electrical device, the first request to register includes the unique identification information, the internal IP address, and the external IP address of the at least one electrical device; storing in the registration server the unique identification information, the internal IP address, and the external IP address of the at least one electrical device using the registration server; receiving in the registration server from a first client computer a first request for information regarding the at least one electrical device, the first request includes the external IP address of the first client computer and the unique identification information of the at least one electrical device; providing to the first client computer the external IP address of the at least one electrical device if the external IP address of the first client computer is different from the external IP address of the at least one electrical device; and providing to the first client computer the internal IP address of the at least one electrical device if the external IP address of the first client computer is identical to the external IP address of the at least one electrical device. The registration server is not part of the first local network. In some examples, the at least one electrical device and the first gateway device are part of the first local network.

Many embodiments can concern a method of determining information regarding an electrical device. The electrical device having unique identification information, an internal IP address, and an external IP address. The method can include: requesting the internal IP address of the electrical device; receiving the internal IP address of the electrical device; setting-up the electrical device, wherein setting-up the electrical device can include communicating to a first server the unique identification information, the internal IP address and the external IP address of the electrical device; using the client computer to query the first server for at least one of the internal IP address or the external IP address of the electrical device; using the client computer to receive at least one of the internal IP address of the electrical device or the external IP address of the electrical device; using the client computer to access the electrical device using at least one of the internal IP address of the electrical device or the external IP address of the electrical device. The electrical device can be part of a different local network than the first server.

Yet other embodiments can concern a registration server configured to provide information regarding two or more electrical devices. Each of the two or more electrical devices has unique identification information, an internal IP address, and an external IP address. The registration server can include: (a) a registration module configured to receive at least two requests to register each of the two or more electrical devices, each of the at least two requests to register includes the unique identification information, the internal IP address, and the external IP address of the two or more electrical devices; (b) a storage module configured to store the unique identification information, the internal IP address, and the external IP address of each of the two or more electrical devices; (c) a request module configured to receive one or more requests for information regarding the two or more electrical devices from one or more client computers and further configured to determine an external IP address of the one or more client computers making the one or more requests for the information; and (d) a return module. A first request of the one or more requests for the information is a request for the information about a first electrical device of the two or more electrical devices is by a first client computer of the one or more client computers. The return module can be configured to redirect the first request of the one or more requests for the information by the first client computer of the one or more client computer to a first gateway device if the external IP address of the first client computer of the one or more client computers is identical to the external IP address of the first electrical device of the two or more electrical devices. The return module can be further configured return the external IP address of the first electrical device of the two or more electrical devices if the external IP address of the first client computer of the one or more client computers is different from the external IP address of the first electrical device of the two or more electrical devices.

Turning to the drawings, FIG. 1 illustrates a block diagram of a system 100 configured to provide information regarding at least one electrical device 110, according to a first embodiment. System 100 is merely exemplary and is not limited to the embodiments presented herein. System 100 can be employed in many different embodiments or examples not specifically depicted or described herein.

In some embodiments, system 100 can include: (a) at least one electrical device 110; (b) at least one of an internal client computer 130 or an external client computer 131; (c) at least one gateway device 150; (d) at least one lookup server 170; and (e) at least one registration server 190. In some examples, lookup server 170 and registration server 190 can be combined into a single dual purpose server and can be called a lookup server, a registration server, or the like. In various examples, internal client computer 130, electrical device 110, and gateway device 150 are part of a local network 101. Lookup server 170, registration server 190, and external client computer 131 are not part of local network 101.

Not to be taken in a limiting sense, a simple example of a method of using system 100 to provide information about electrical device 110 includes electrical device 110 being assigned a new dynamically generated internal IP address by gateway device 150 (or another networking device). Electrical device 110 then registers unique identification information, the assigned internal IP address, and the external IP address of electrical device 110 (e.g., the IP address of gateway device 150) with registration server 190. In some examples, electrical device 100 registers the assigned external IP address of electrical device 110 without knowing the assigned external IP address. For example, registration sever 190 can obtain the external IP address of electrical device 110 using source packet information contained in the register request.

In some examples, registration server 190 can be a trusted DHCP-DNS server (a type of domain name system server that allows an electrical device to register both the internal and the external IP addresses of the electrical device). In many examples, registration server 190 is available and residing in a network (i.e., not local network 101) that is visible by any client (e.g., internal client computer 130 and external client computer 131) that needs to access registration server 190 (e.g., the public internet). Electrical device 110, as part of the registration process with registration server 190, also can provide other unique identification information such as authentication information (e.g., a username and a password) for electrical device 110, service or type of service it provides, model number, MAC address, etc. Electrical device 110 can re-register this information as needed (e.g., when the internal IP address of electrical device 110 is updated dynamically).

After the registration process is complete, registration server 190 can receive a request for information regarding electrical device 110 from a requesting client computer (e.g., internal client computer 130 or external client computer 131). The request for information can include the MAC address of electrical device 110 (or any other unique identification information). Registration server 190 can examine the MAC address (or any other unique identification information) and apparent external source IP address of a requesting client computer to determine what information to provide in response to the request for information. In some examples, the requesting client computer is also required to provide authentication information (e.g., username/password) for security purposes.

In some examples, if: (a) the apparent external source IP address of the requesting client computer matches the external IP address of electrical device 110, and (b) the unique identification information and the authentication information provided by the requesting client computer matches with the unique identification information and the authentication information of electrical device 110, registration server 190 determines that the client computer is requesting access to the information about electrical device 110 from within the same network (i.e., local network 101) as electrical device 110. In this case, registration server 190 returns the most recently registered internal IP address for electrical device 110.

In other examples, registration server 190 does not provide the most recently registered internal IP address of electrical device 110. Rather, registration server 190 redirects the request for information to gateway device 150, and gateway device 150 can provide the internal IP address of electrical device 110. By providing the internal IP address to the requesting client computer, the requesting client computer (e.g., internal client computer 130) is able to directly access the services provided by electrical device 110.

If the apparent external IP address of the requesting client computer is different than the external IP address of electrical device 110 but the unique identification information and authentication information provide by the client computer matches the stored information, registration server 190 can return the most recently registered external IP address of electrical device 110 to the requesting client computer.

Figure 2:
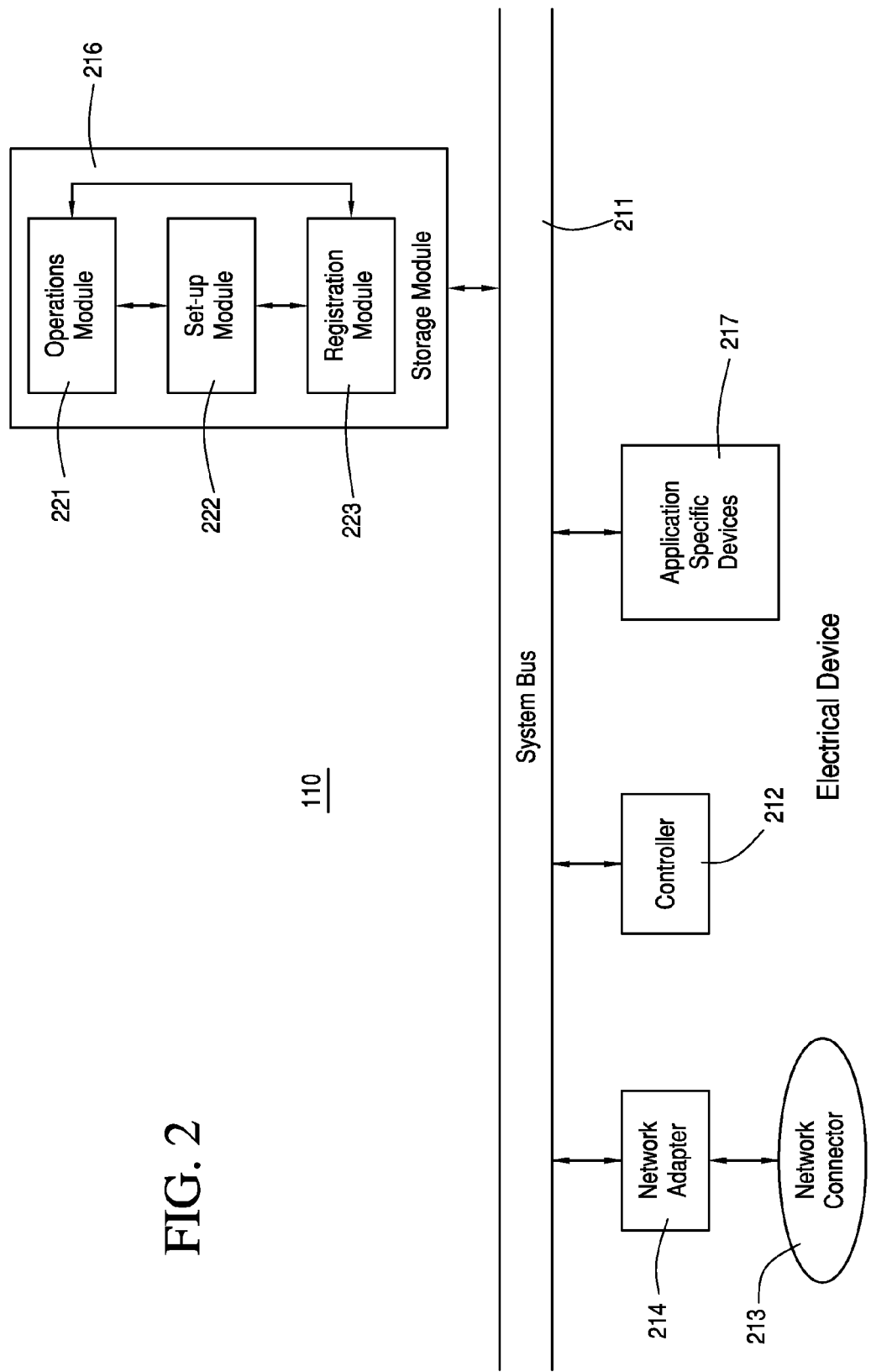
FIG. 2 illustrates a block diagram of an exemplary electrical device of FIG. 1, according to the first embodiment.

FIG. 2 illustrates a block diagram of electrical device 110, according to the first embodiment. Electrical device 110 is merely exemplary and is not limited to the embodiments presented herein. Electrical device 110 can be employed in many different embodiments or examples not specifically depicted or described herein.

In some examples, electrical device 110 can include: (a) a system bus 211; (b) a controller 212 coupled to system bus 211; (c) at least one network connector 213; (d) at least one network adapter 214 coupled to system bus 211 and network connector 213; (e) storage module 216 coupled to system bus 211; (f) one or more application specific devices 217; (g) an operations module 221; (h) a set-up module 222; and (i) a registration module 223. In these examples, electrical device 110 does not have a visual display or a visual user interface. In the same or different examples, the components of electrical device 110 can be coupled together without using system bus 211. In various embodiments, the architecture of controller 212 can be compliant with any of a variety of commercially distributed architectures.

Network connector 213 can be any type of network connector such as, for example, an ethernet connector, a universal serial bus (USB) connector, a serial port connector, a parallel port connector, and the like. In other examples, network connector 213 can include a wireless network adapter and an antenna. In many examples, electrical device 110 can be coupled to gateway device 150 (FIG. 1) using network connector 213.

Application specific devices 217 can include any other devices and/or adapters that are required for electrical device 110 to perform its designed functions. For example, electrical device 110 can be a motion detection device, and application specific devices 217 can include the sensors needed to detect motion. In many examples, application specific devices 217 do not include any devices that have visual display capabilities (e.g., a monitor or a liquid crystal display (LCD)). In many examples, adding a visual display device is too costly or unnecessary for the primary function of electrical device 110. Accordingly, when electrical device is configured using DHCP or another protocol, no mechanism exists to provide the configuration information (e.g., an internal or external IP address of electrical device 110) to a user.

Storage module 216 can include memory, both read only memory (ROM) and random access memory (RAM). Non-volatile portions of storage module 216 or the ROM can be encoded with a boot code sequence suitable for restoring electrical device 110 (FIG. 1) to a functional state after a system reset. Storage module 216 can also include a hard disk and/or other types of storage devices.

Operations modules 221 can be configured to operate and provide the designed functionality of electrical device 110. Set-up module 222 can be configured to handle the set-up and configuration of electrical device 110. Registration module 223 can be configured to communicate with lookup server 170 (FIG. 1) and/or registration server 190 (FIG. 1) to register the internal and external IP addresses and other information about electrical device 110.

In some examples, storage module 216 can store operations module 221, set-up module 222, and/or registration module 223, and these modules can be performed using controller 212. When electrical device 110 of FIGS. 1 and 2 is running, program instructions stored in storage module 216 can be executed by controller 212. A portion of the program instructions stored in storage module 216 can be suitable for carrying out at least portions of the methods of transmitting data between other elements of system 100 (FIG. 1), as described hereinafter with respect to FIGS. 8-12. In same or different examples, at least portions of the methods of transmitting data between the other elements, as described hereinafter with respect to FIGS. 8-12, can be implemented by circuitry in electrical device 110.

Figure 3:
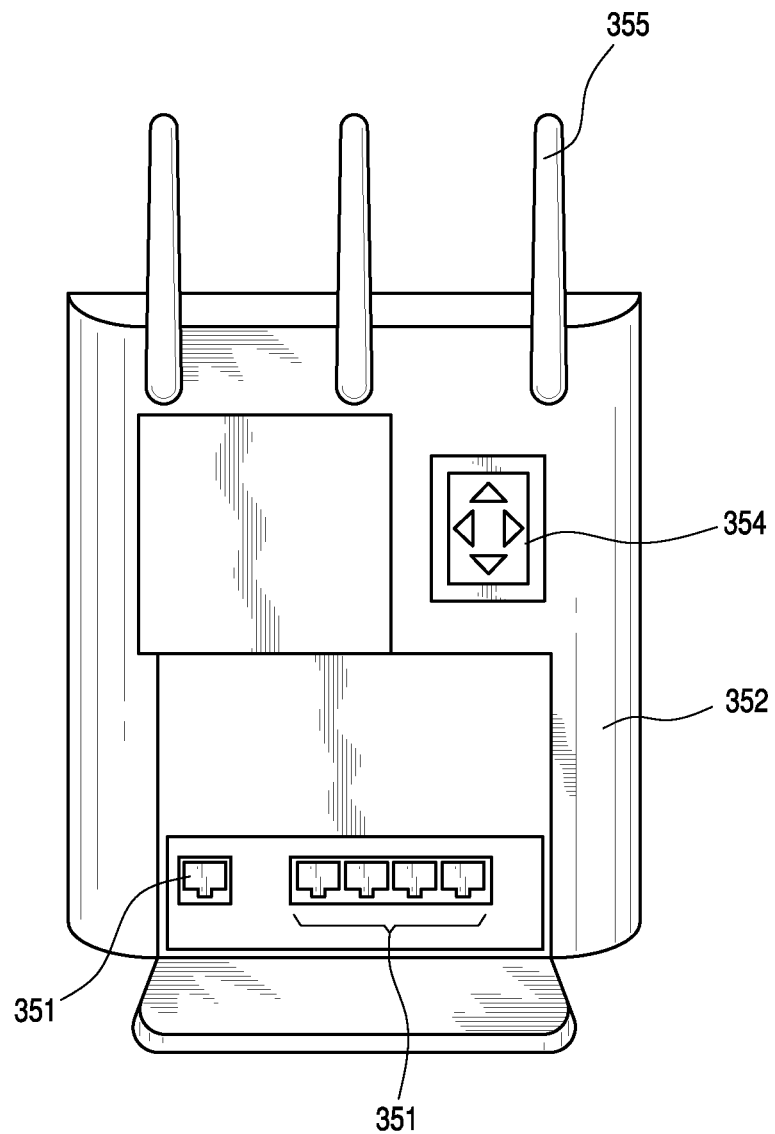
FIG. 3 illustrates a rear view of an exemplary gateway device of FIG. 1, according to the first embodiment.

FIG. 3 illustrates a rear view of gateway device 150 for broadcasting data, according to the first embodiment. Gateway device 150 is merely exemplary and is not limited to the embodiments presented herein. Gateway device 150 can be employed in many different embodiments or examples not specifically depicted or described herein. In the same or different embodiments, gateway device 150 can be considered a computer component for communicating data between a network (e.g., the internet) and internal client computer 130 (FIG. 1) and electrical device 110 (FIG. 1). Gateway device 150 can be an electrical device used to connect a computer or electrical device to a network. For example, gateway device 150 can include one or more of: a router, a hub, a wireless access point, a modem-router, a VoIP (voice over internet protocol) modem-router, a wireless ethernet bridge, and a wireless network interface card (WNIC).

Gateway device 150 can include a chassis 352 containing one or more circuit boards (not shown), one or more network connectors 351, an input device 354, and one or more antennas 355. Antennas 355 can be used to transfer or transmit information using electromagnetic waves (i.e., a wireless network). Network connectors 351 can be any type of network connectors such as, for example, Ethernet connectors, universal serial bus (USB) connectors, serial port connectors, parallel port connectors, and the like. In one example, network connectors 351 include one ADSL (Asymmetric Digital Subscriber Line) connector and four Ethernet ports.

Figure 4:
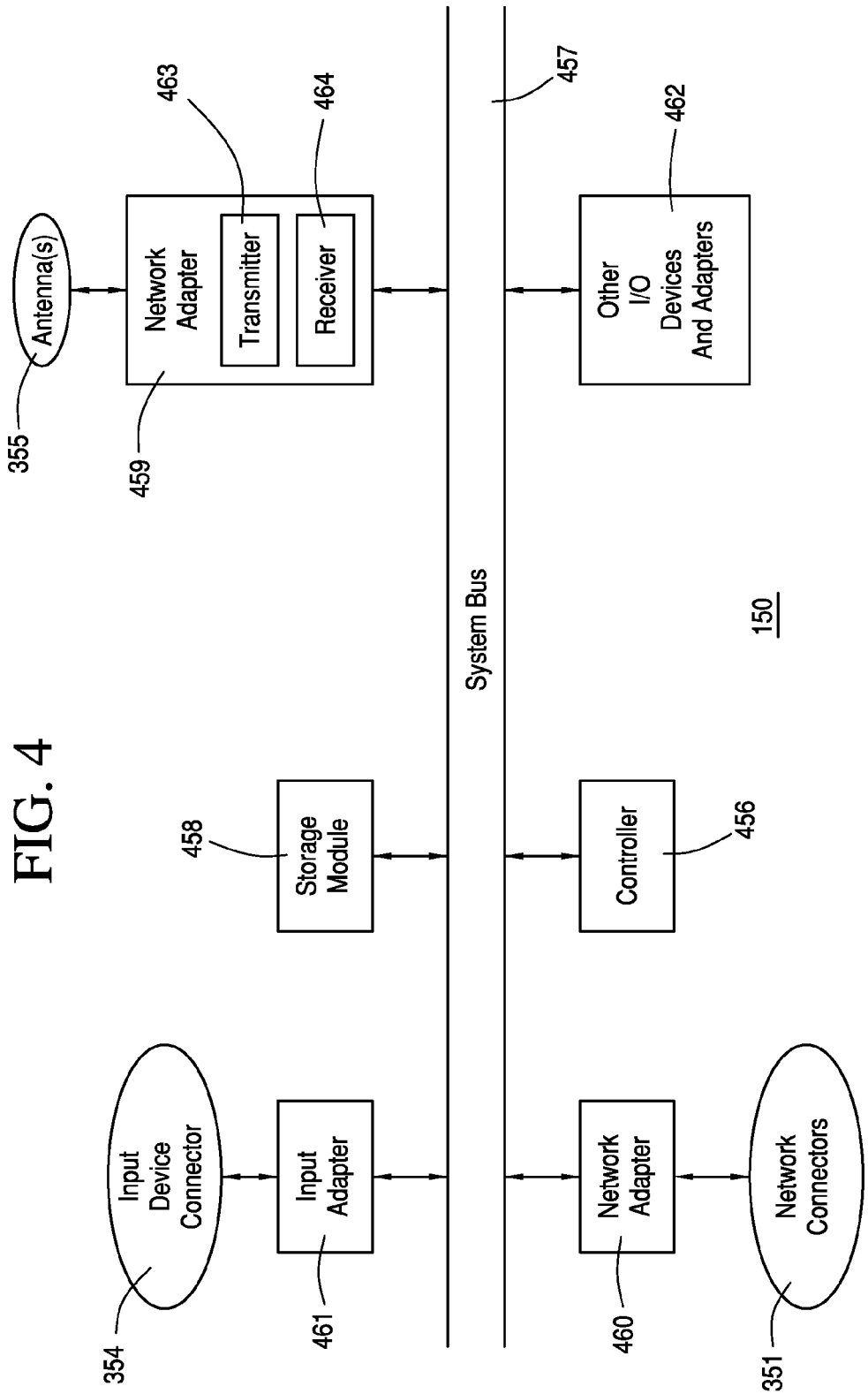
FIG. 4 illustrates a representative block diagram of an example of the elements included in the circuit boards inside a chassis of the gateway device of FIG. 3.

A representative block diagram of an example of the elements included in the circuit board(s) inside chassis 352 is shown in FIG. 4. In the embodiment shown in FIG. 4, a controller 456 is coupled to a system bus 457. In various embodiments, the architecture of controller 456 can be compliant with any of a variety of commercially distributed architectures. In other examples, gateway device 150 (FIG. 3) does not include system bus 457, and the components of gateway device 150 can communicate with system bus 457.

In the embodiment of FIG. 4, system bus 457 is also coupled to storage module 458 that can include read only memory (ROM), random access memory (RAM), a hard drive and/or other storage devices. Also, various I/O (input/output) devices such as one or more network adapters 459 and 460, an input adapter 461, and other I/O devices and adapters 462 can be coupled to system bus 457. Network adapter 459 can be coupled to antenna(s) 355, and network adapter 460 can be coupled to network connectors 351. Network connectors 351 and antenna(s) 355, though network adapters 460 and 459, respectively, can be coupled to controller 212 (FIG. 2) directly or through system bus 457. In other embodiments, a single network adapter can be used to control all of these I/O devices.

In some examples, network adapter 459 can include transmitter 463 and receiver 464. Transmitter 463 can be a radio frequency or other wireless transmitter. Receiver 464 can be a radio frequency or other wireless receiver. In numerous embodiments, transmitter 463 and receiver 464 can include or be radios.

When gateway device 150 in FIGS. 1 and 3-4 is running, program instructions stored in storage module 458 are executed by controller 456. A portion of the program instructions stored in storage module 458 can be suitable for carrying out at least portions of the methods of transmitting data between other elements of system 100 (FIG. 1), as described hereinafter with respect to FIGS. 8-12. In same or different examples, at least portions of the methods of transmitting data between the other elements, as described hereinafter with respect to FIGS. 8-12, can be implemented by circuitry in gateway device 150.

Figure 5:
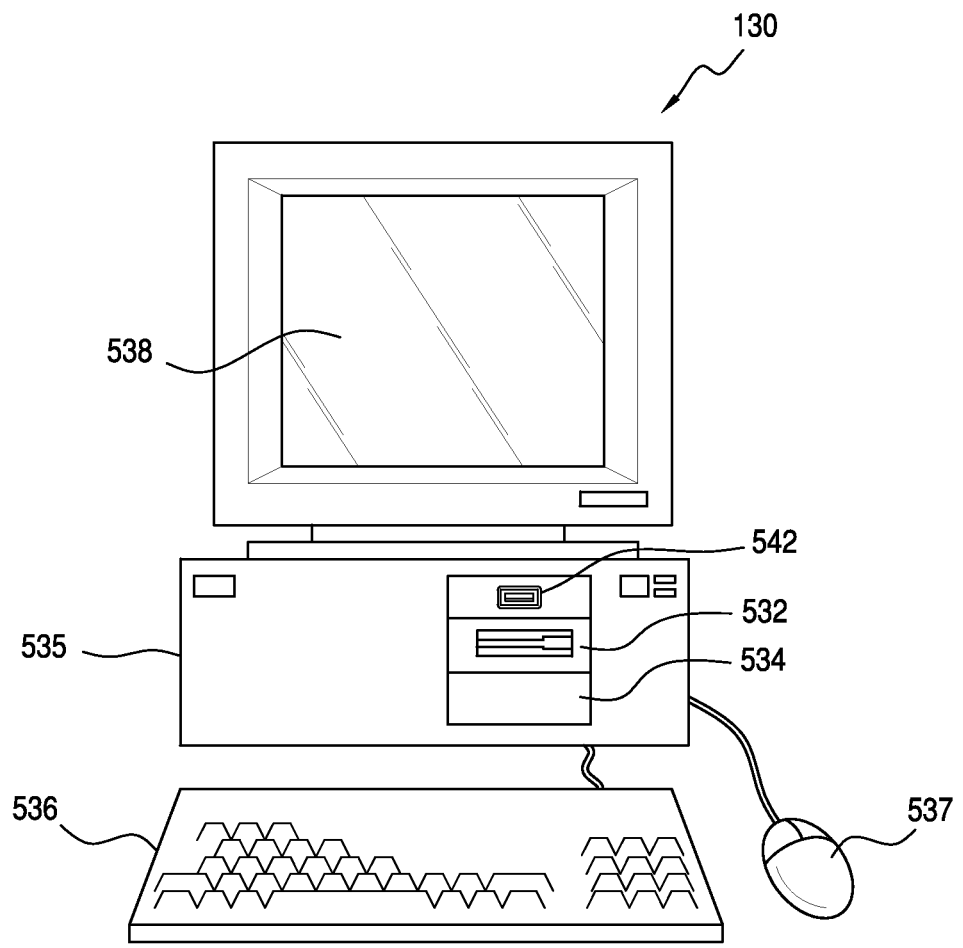
FIG. 5 illustrates a front view of an exemplary internal client computer of FIG. 1, according to the first embodiment.

FIG. 5 illustrates a block diagram of internal client computer 130, according to the first embodiment. Internal client computer 130 is merely exemplary and is not limited to the embodiments presented herein. Internal client computer 130 can be employed in many different embodiments or examples not specifically depicted or described herein. Internal client computer 130 includes a chassis 535 containing one or more circuit boards (not shown), a USB (universal serial bus) port 542, a Compact Disc Read-Only Memory (CD-ROM) and/or Digital Video Disc (DVD) drive 532, and a hard drive 534.

Figure 6:
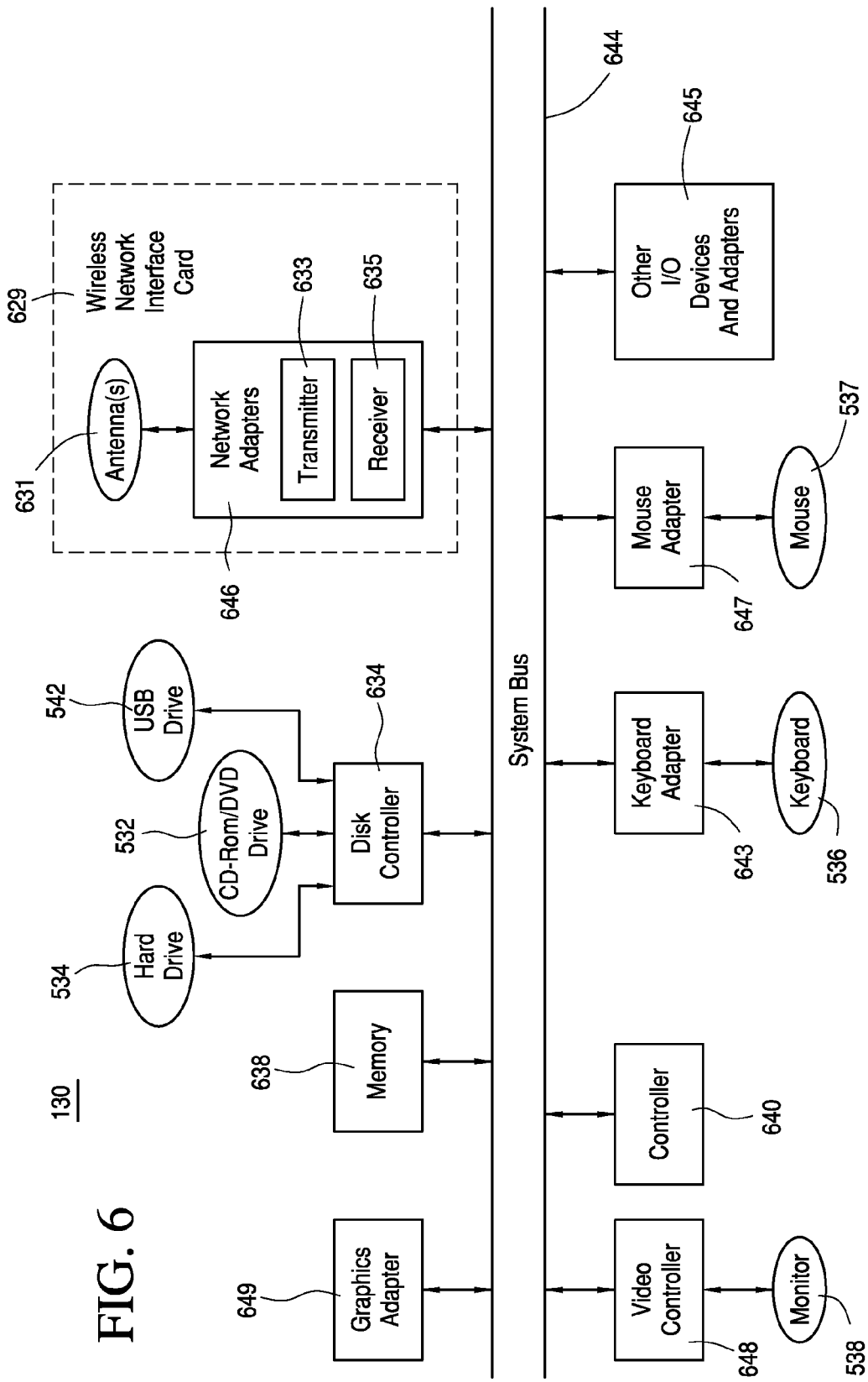
FIG. 6 illustrates a representative block diagram of an example of the elements included in the circuit boards inside chassis of the internal client computer of FIG. 5.

A representative block diagram of the elements included on the circuit boards inside chassis 535 is shown in FIG. 6. A controller 640 in FIG. 6 is coupled to a system bus 644 in FIG. 6. In various embodiments, the architecture of controller 640 can be compliant with any of a variety of commercially distributed architecture families.

System bus 644 also is coupled to memory 638 that includes both read only memory (ROM) and random access memory (RAM). Non-volatile portions of memory 638 or the ROM can be encoded with a boot code sequence suitable for restoring internal client computer 130 (FIG. 1) to a functional state after a system reset. In addition, memory 638 can include microcode such as a Basic Input-Output System (BIOS).

In the depicted embodiment of FIGS. 5-6, various I/O devices such as a disk controller 634, a graphics adapter 649, a video controller 648, a keyboard adapter 643, a mouse adapter 647, network adapter 646, and other I/O devices and adapters 645 can be coupled to system bus 644. Keyboard adapter 643 and mouse adapter 647 are coupled to keyboard 536 (FIGS. 5 and 6) and mouse 537 (FIGS. 5 and 6), respectively. While graphics adapter 649 and video controller 648 are indicated as distinct units in FIG. 6, video controller 648 can be integrated into graphics adapter 649, or vice versa in other embodiments. Video controller 648 is suitable for refreshing monitor 538 (FIGS. 5 and 6) to display images in monitor 538 (FIGS. 5 and 6) of internal client computer 130. Disk controller 634 can control hard drive 534 (FIGS. 5 and 6), CD-ROM or DVD drive 532 (FIGS. 5 and 6), and USB port 542 (FIGS. 5 and 6). In other embodiments, distinct units can be used to control each of these devices separately.

Network adapters 646 can be coupled to one or more antennas 631. In some embodiments, network adapters 646 are part of a WNIC (wireless network interface controller) card 629 plugged or coupled to an expansion port (not shown) in internal client computer 130 (FIG. 1). In other embodiments, WNIC card 629 is a wireless network card built into internal client computer 130 (FIG. 1). A wireless network adapter can be built into internal client computer 130 by having wireless ethernet capabilities integrated into the motherboard chipset (not shown), or implemented via a dedicated wireless ethernet chip (not shown), connected through the PCI (peripheral component interconnector) or a PCI express bus. In some examples, each of network adapters 646 can include a transmitter 633 and receiver 635. Transmitter 633 can be a radio frequency or other wireless transmitter. Receiver 635 can be a radio frequency or other wireless receiver. In numerous embodiments, transmitter 633 and receiver 635 can include or be radios. In other embodiments, network adapter 646 can be a wired network adapter.

When internal client computer 130 in FIGS. 1 and 5-6 is running, program instructions stored on a USB drive coupled to USB port 542, on a CD-ROM or DVD in CD-ROM and/or DVD drive 532, on hard drive 534, or in memory 638 (FIG. 6) are executed by controller 640 (FIG. 6). A portion of the program instructions stored in these devices can be suitable for carrying out at least portions of the methods of transmitting data between a network (e.g., the internet) and internal client computer 130 and electrical device 110, as described hereinafter with respect to FIGS. 5-8. In same or different examples, at least portions of the methods of transmitting data between a network and internal client computer 130 and electrical device 110, as described hereinafter with respect to FIGS. 5-8, can be implemented by circuitry in internal client computer 130.

In various embodiments, external client computer 131 can be similar to or the same as internal client computer 130.

Figure 7:
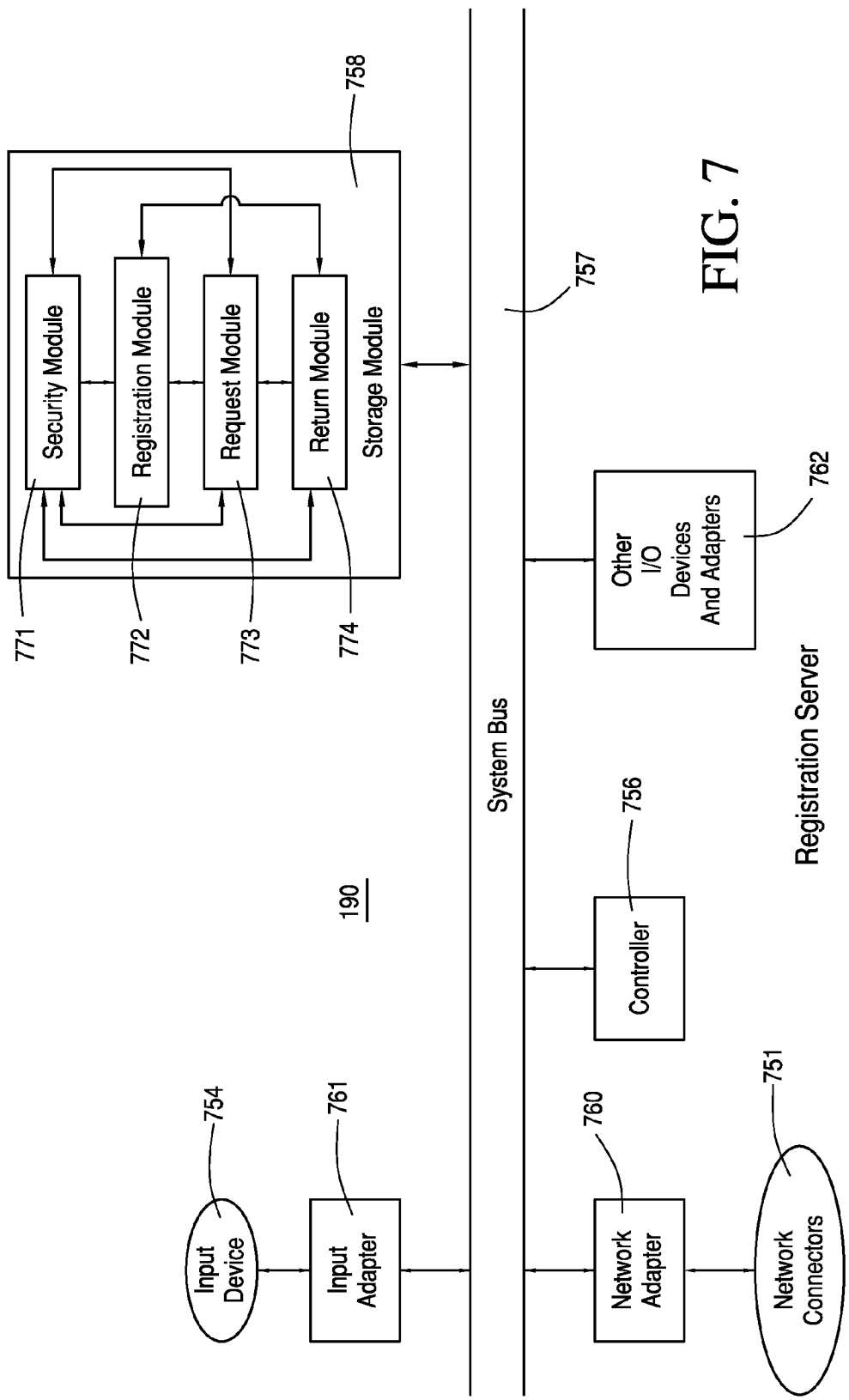
FIG. 7 illustrates a block diagram of an exemplary registration server of FIG. 1, according to the first embodiment.

FIG. 7 illustrates a block diagram of an exemplary example of registration server 190, according to the first embodiment. Registration server 190 is merely exemplary and is not limited to the embodiments presented herein. Registration server 190 can be employed in many different embodiments or examples not specifically depicted or described herein.

Registration server 190 can perform two main functions in some examples.

The first function is to receive registration information provided by electrical device 110 (FIG. 1). When this information is received, registration server 190 stores the external IP address (or source IP address) of the requesting device (i.e., electrical device 110, where the external IP address of electrical device 110 is the external IP address of gateway device 150) provided by electrical device 110 and/or gateway device 150, as well as the internal IP address of the same requesting device provided by electrical device 110 and/or gateway device 150, and any other uniquely identifying information contained within the registration information. In some examples, electrical device 110 can provide its external IP address. In other examples, registration server 190 can determine the external IP address of electrical device 110 from header information of the TCP/IP packets from electrical device 110.

The second function of registration server 190 is to serve as a type of DNS server. Traditional DNS servers merely provide a stored external IP address as a result of a look-up request with no other input. Registration server 190, on the other hand, receives a MAC address (or any other unique identification information) from the requesting client computer (e.g., internal client computer 130 and/or external client computer 131) and can examine the MAC address (or any other unique identification information) and the apparent external source IP address of the requesting client computer. This apparent external source IP address of the requesting client computer is used to determine the information about a registered electrical device (e.g., electrical device 110) to return to the requesting computer. In some examples, the requesting client computer is also required to provide authentication information (e.g., a username and a password) for security purposes.

This approach can use external public DNS server mechanisms and can add the additional functionality of being able to register two IP addresses to a single DNS hostname entry. Registration server 190 can be configured to determine the proper IP address to return in response to a query.

Other systems and methods to return dynamically assigned IP addresses can introduce a second layer DNS server within a local network to allow discovery of dynamically assigned IP addresses. Using these other methods, in order to access a particular electrical device, the external client (e.g., a device outside the local network) needs to look up the local network address first, and then query the internal lookup server to determine the internal IP address of the specific electrical device. In contrast, the system and device described herein allows each electrical device within the local network to register itself (or allows for a third device like a gateway device to register the electrical device) to an external lookup server. Accordingly, the systems and methods described herein allow a single lookup to find the IP address(es) of electrical device 110.

Furthermore, in these other systems and methods that use a second layer DNS server, all of the nodes (i.e., internal client computers, electrical devices, etc.) inside the network have to point their primary DNS server records to the internal DNS server of the local network for the systems or methods to work. If that internal DNS server disappeared for whatever reason (e.g., crashed, turned off, etc.), all of the internal nodes on the local network would also fail because these other devices would lack the ability to resolve domain names. In contrast, the systems and methods described herein do not require reworking the internal configuration of the local network or relying on a public system that is more robust.

Referring again to FIG. 7, in many examples, registration server 190 (i.e., a serving device) can be configured to provide information regarding one or more electrical devices (e.g., an internal IP address, and/or an external IP address). Registration server 190 can include: (a) at least one input device 754; (b) at least one input adapter 761; (c) at least one network adapter 760; (d) at least one network connector 751; (e) at least one controller 756; (f) other I/O devices and adapters 762; (g) a storage module 758; (h) a security module 771 configured to run on controller 756; (i) a registration module 772 configured to run on controller 756; (j) a request module 773 configured to run on controller 756; and (k) a return module 774 configured to run on controller 756.

Security module 771 can be configured to determine if authentication information is correct. In various embodiments, security module 771 can determine if the authentication information provided by the client computer matches the stored authentication information for electrical device 110. For example, security module 771 can authenticate the user based on the username and the password. That is, security module 771 can authenticate the user if the username and the password of the authentication information provided by the client computer is the same as the username and the password for electrical device 110 as stored by the registration server Registration module 772 can be configured to receive at least one request to register the one or more electrical devices (e.g., electrical device 110). In some examples, the request to register an electrical device can include at least one request to register the MAC address (or any other unique identification information), the internal IP address, and the external IP address of the electrical device. Storage module 758 can be configured to store the MAC address (or any other unique identification information), the internal IP address, and the external IP address of the one or more electrical devices. In the same or different examples, the request to register can also include authentication information.

Request module 773 can be configured to receive one or more requests for information regarding the one or more electrical devices from one or more client computers. Request module 773 can be further configured to determine the external IP address of the requesting client computer. For example, request module 773 can determine the external IP address of the requesting client computer by examining the headers of the TCP/IP packets from the requesting client computer.

Return module 774 can be configured return the external IP address of electrical device 110 if the external IP address of the client computer (e.g., external client computer 131) is different than the external IP address of electrical device 110. Furthermore, return module 774 can be configured to redirect a request for information about electrical device 110 to gateway device 150 if an external IP address of the first client computer (i.e., internal client computer 130) is the same as the external IP address of electrical device 110. In other examples, return module 774 can return the information about electrical device 110 regardless of the external IP address of the requesting client computer.

"Server," as used herein, can refer to a single computer, a single server, or a cluster or collection of servers. Typically, a cluster or collection of servers can be used when the demands by client computers (e.g., electrical device 110, internal client computer 130, and/or external client computer 131) are beyond the reasonable capability of a single server or computer. In many embodiments, the servers in the cluster or collection of servers are interchangeable from the perspective of the client computers and can be located at the same or different places. Furthermore, the server can have internal and/or external memory.

If registration server 190 is a single server, it can include registration module 772, request module 773, and return module 774. In other examples, a first server can include a first portion of these modules, and one or more second servers can include a second, possibly overlapping, portion of these modules. In these examples, registration server 190 can comprise the combination of the first server and the one or more second servers.

In some examples, storage module 758 can store the information about the one or more electrical devices. In some examples, storage module can store a structured collection of records or data, for instance. For example, the information about the one or more electrical devices can be stored as an XML (Extensible Markup Language) database, MySQL database, or an Oracle® database. In the same or different embodiments, the information about the one or more electrical devices can be stored in a searchable group of individual data files.

Figure 8:
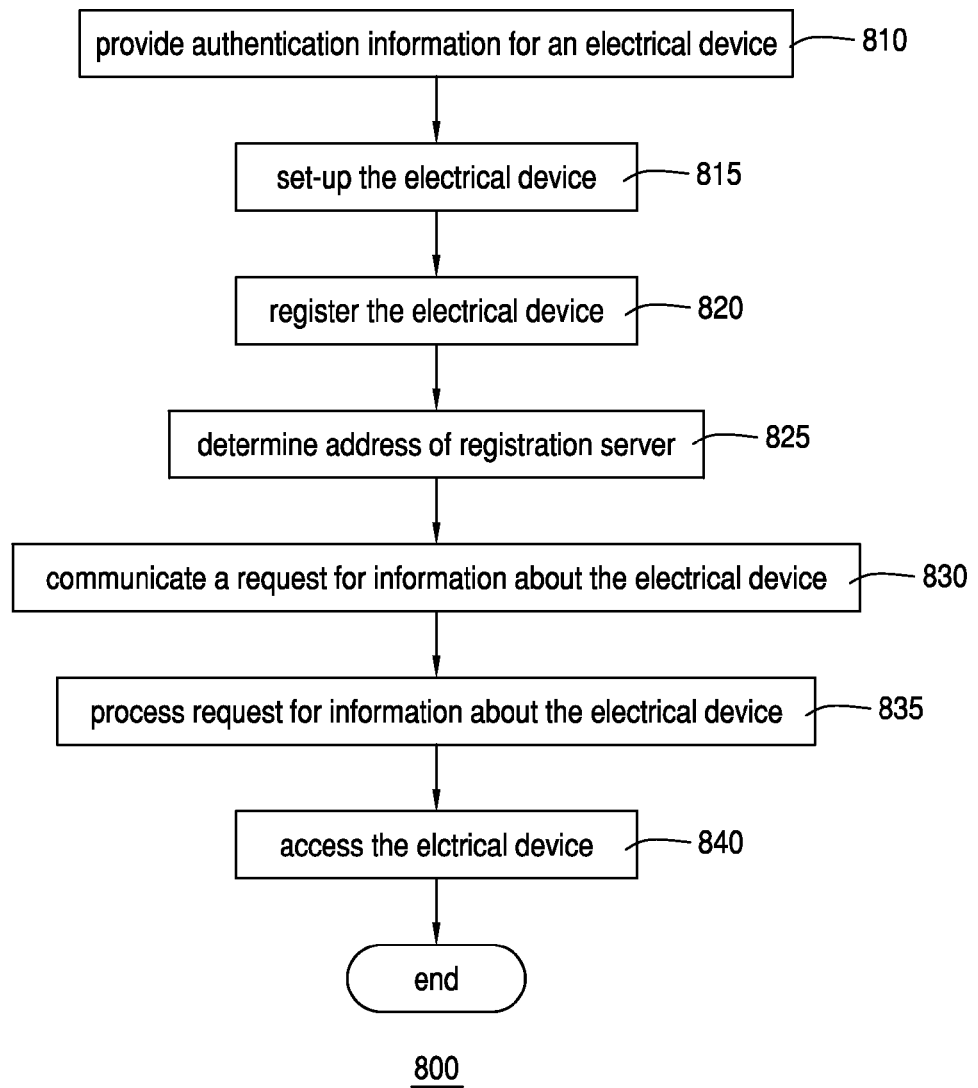
FIG. 8 illustrates a flow chart for an exemplary embodiment of a method of distributing information regarding one or more electrical devices using a first server, according to the first embodiment.

Turning to another embodiment, FIG. 8 illustrates a flow chart for an exemplary embodiment of a method 800 of distributing information regarding one or more electrical devices using a first server. Method 800 can also be considered a method of determining information regarding at least one electrical device. Method 800 is merely exemplary and is not limited to the embodiments presented herein. Method 800 can be employed in many different embodiments or examples not specifically depicted or described herein. In some embodiments, the activities, the procedures, and/or the processes of method 800 can be performed in the order presented. In other embodiments, the activities, the procedures, and/or the processes of method 800 can be performed in any other suitable order. In still other embodiments, one or more of the activities, the procedures, and/or the processes in method 800 can be combined or skipped.

Referring to FIG. 8, method 800 includes an activity 810 of providing authentication information for an electrical device. In some examples, the authentication information is provided to a user of the electrical device. In some examples, the electrical device can be similar to or the same as electrical device 110 of FIG. 1. The authentication information can include at least one of a username or a password.

In some embodiments, a user of an electrical device can receive the authentication information with the electrical device. For example, the authentication information can be included with the packaging of the electrical device. In another example, a user of the electrical device can request the information (e.g., request the information over a website of the manufacturer or distributor of the electrical device) and the manufacturer or distributor, for example, can provide the authentication information. In still another example, the electrical device can be used to create at least one of the username or the password. In yet another example, the electrical device can provide the predetermined authentication information to the user.

Method 800 in FIG. 8 continues with an activity 815 of setting-up the electrical device. In various embodiments, setting-up the electrical device can include coupling the electrical device to a gateway device and performing any necessary set-up routines that are specific to the electrical device. After being coupled to the gateway device, the electrical device can request from the gateway device (or another networking device) an assignment of an internal IP address. For example, the assigning of an internal IP address can be performed using DHCP. In some examples, a set-up module (e.g., set-up module 222 (FIG. 2)) can be used to help facilitate the set-up of the electrical device.

After the set-up process is complete, in some examples, the electrical device will have been assigned an internal IP address, but a user of the electrical device will lack an easy method to determine the new IP address if the electrical device lacks a visual user interface. The rest of method 800 provides an easy method for a user to determine the new IP address of the electrical device without having to navigate proprietary menus or screens in a computer, the electrical device, or the gateway device.

Figure 9:
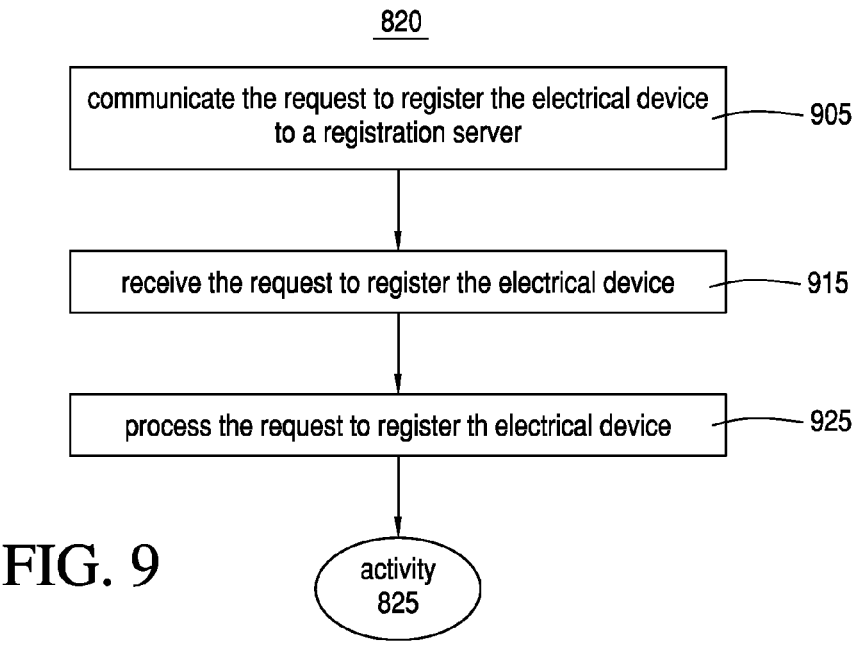
FIG. 9 illustrates a flow chart for an exemplary embodiment of an activity of registering the electrical device, according to the first embodiment.

Subsequently, method 800 of FIG. 8 includes an activity 820 of registering the electrical device. In some example, information about the electrical device can be registered with a registration server. For example, the electrical device and the registration server can be similar to or the same as electrical device 110 and registration server 190 of FIG. 1. FIG. 9 illustrates a flow chart for an exemplary embodiment of activity 820 of registering the electrical device, according to the first embodiment.

Referring to FIG. 9, activity 820 includes a procedure 905 of communicating the request to register the electrical device to a registration server. In many examples, the electrical device can communicate the request to register the electrical device to the registration server via the Internet or another communications network. In some examples, the electrical device can include its MAC address, its internal IP address, its external IP address, and/or other unique identification information as part of the request for registration. In some examples, the electrical device automatically communicates this information to the registration server in real time. In the same or different examples, the request for registration can also include the authentication information associated with the electrical device.

Activity 820 in FIG. 9 continues with a procedure 915 of receiving the request to register the electrical device. In some examples, the registration server can receive the request to register from the electrical device. The received request for registration can include the MAC address, the internal IP address, the external IP address, and/or other unique identification information of the first electrical device. In other examples, the request to register includes the MAC address and the internal IP address, but not the external IP address. In these examples, the registration server can determine the external IP address by examining the header or other information transferred as part of the standard TCP/IP packet. In the same or different examples, the request for registration can also include the authentication information associated with the electrical device. In some examples, a registration module (e.g., registration module 772 of FIG. 7) can handle at least part of procedure 915.

Subsequently, activity 820 of FIG. 9 includes a procedure 925 of processing the request to register the electrical device. In some embodiments, procedure 925 can include storing the MAC address, the internal IP address, the external IP address, and/or other unique identification information of the electrical device. In the same or different examples, the registration server can also store the authentication information associated with the electrical device. For example, the registration server can store the registration information of the electrical device in a storage module. In various examples, the storage module can be similar to or the same as storage module 758 of FIG. 7. In some examples, a registration module (e.g., registration module 772 of FIG. 7) can handle at least part of procedure 925. After procedure 925, activity 820 is complete.

In various embodiments, activity 820 can repeated to register different electrical devices. For example, activity 820 can be performed to register a first electrical device and repeated one or more second times to register one or more second electrical devices.

Referring again to FIG. 8, method 800 of FIG. 8 continues with an activity 825 of determining the address of registration server. In some examples, a client computer (e.g., internal client computer 130 or external client computer 131 of FIG. 1) can desire to request information about an electrical device registered with the registration server, but the client computer needs the IP address of the registration server. In activity 825, the client computer can determine the IP address of the registration server by sending a request to a lookup server for the IP address of the registration server. The lookup server can return the IP address of the registration server to the client computer. In various examples, the client computer can send a DNS (domain name server) lookup request to the lookup server to retrieve the IP address of the registration server. In many embodiments, the lookup server can be similar or identical to lookup server 170 of FIG. 1.

After determining the IP address of the registration server, method 800 in FIG. 8 continues with an activity 830 of communicating a request for information about the electrical device. In many embodiments, a client computer (e.g., internal client computer 130 or external client computer 131 of FIG. 1) can query the registration server for at least one of the internal IP address or the external IP address of the electrical device. In some examples, the client computer can transmit the request for information about the electrical device to the registration server over the Internet and/or one or more other networks. In some examples, the request for information can include the MAC address or other unique identification information of the electrical device.

Figure 10:
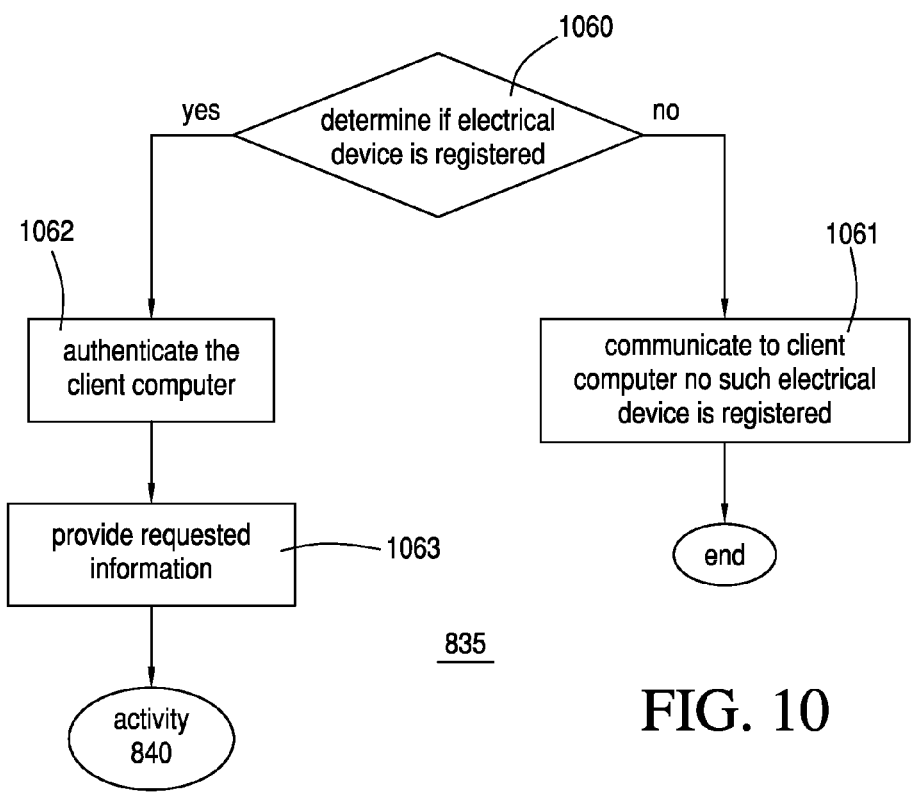
FIG. 10 illustrates a flow chart for an exemplary embodiment of an activity of processing a request for information about the electrical device, according to the first embodiment.

Subsequently, method 800 of FIG. 8 includes an activity 835 of processing a request for information about the electrical device. FIG. 10 illustrates a flow chart for an exemplary embodiment of activity 835 of processing a request for information about the electrical device, according to the first embodiment.

Referring to FIG. 10, activity 835 includes a procedure 1060 of determining if the electrical device is registered. In some examples, the registration server can determine whether the electrical device is registered by searching the stored information about registered electrical devices to determine if the specific electrical device is registered with the registration server. In various embodiments, the request module of the registration server can determine if any information exists in the storage module for the MAC address or other unique identification information of the electrical device. In some examples, a request module (e.g., request module 773 of FIG. 7) can perform at least part of procedure 1060. If the electrical device is not registered with the registration server, the next procedure in activity 835 in FIG. 10 is a procedure 1061. If the electrical device is registered with the registration server, the next procedure in activity 835 in FIG. 10 is a procedure 1062.

Procedure 1061 communicates to the client computer that no such electrical device is registered. If the request module determines that the electrical device for which information was requested is not registered with the registration server, the return module can communicate to the client computer that no information is available about the specific electrical device. In some examples, a return module (e.g., return module 774 of FIG. 7) can perform at least part of procedure 1061. If no such electrical device is registered after procedure 1061, activity 835 (FIGS. 8 and 10) and method 800 (FIG. 8) are complete.

Figure 11:
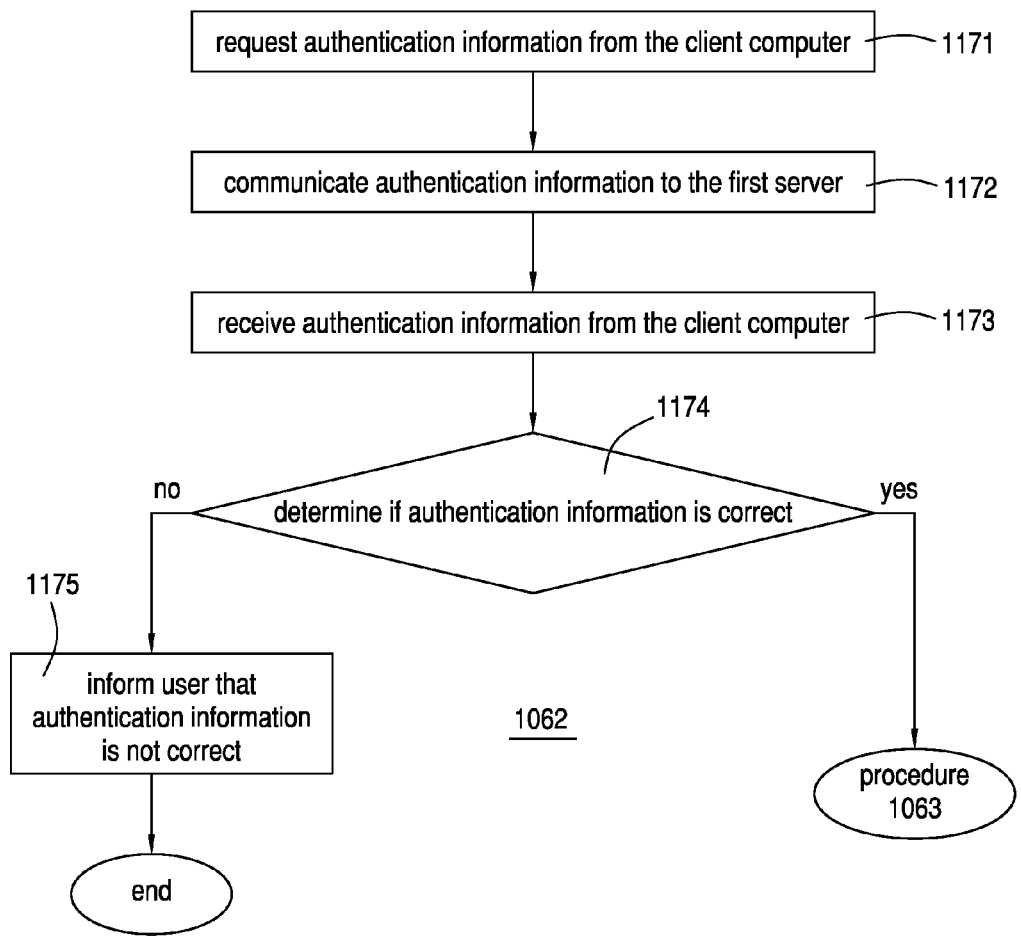
FIG. 11 illustrates a flow chart for an exemplary embodiment of a procedure of authenticating a user of the client computer, according to the first embodiment.

Procedure 1062 authenticates the client computer. In some examples, to provide enhanced security, authentication of the client computer can be required before information about the electrical device is provided to the user of the client computer. FIG. 11 illustrates a flow chart for an exemplary embodiment of procedure 1062 of authenticating the client computer, according to the first embodiment. In some examples, a security module (e.g., security module 771 of FIG. 7) can perform at least part of procedure 1062.

Referring to FIG. 11, procedure 1062 includes a process 1171 of requesting authentication information from the client computer. In some examples, the requested authentication information can include at least one of a username or a password.

Next, procedure 1062 of FIG. 11 includes a process 1172 of communicating authentication information to the first server. In some examples, the client computer can provide at least one of a username or a password to the registration server.

Procedure 1062 in FIG. 11 continues with a process 1173 of receiving authentication information of a user of the client computer. In some examples, the requesting module or the return module of the registration server can receive the authentication information from the client computer.

Subsequently, procedure 1062 of FIG. 11 includes a process 1174 of determining if authentication information is correct. In various embodiments, the security module of the registration server can determine if the authentication information provided by the client computer matches the stored authentication information for the electrical device. For example, the security module can authenticate the user based on the username and the password. That is, the registration server can authenticate the user if the username and the password of the authentication information provided by the client computer is the same as the username and the password for the electrical device as stored by the registration server. If the authentication information is correct, procedure 1062 is complete and the next procedure is procedure 1063 of FIG. 10. If the authentication information is not correct, the next process in procedure 1062 of FIG. 11 is process 1175.

Process 1175 informs the user that the authentication information is not correct. In some examples, the registration server can communicate to the client computer that the authentication information is not correct and that the registration server cannot process the request for information about the electrical device. In some embodiments, the registration server can give the user one or more additional attempts to submit the correct authentication information before rejecting the request. After process 1175, procedure 1062, activity 835 (FIGS. 8 and 10), and method 800 (FIG. 8) are complete.

In other embodiments, the registration server does not require authentication of the user of the client computer before providing the information about the electrical device. In these examples, procedure 1062 of FIG. 10 can be skipped.

Figure 12:
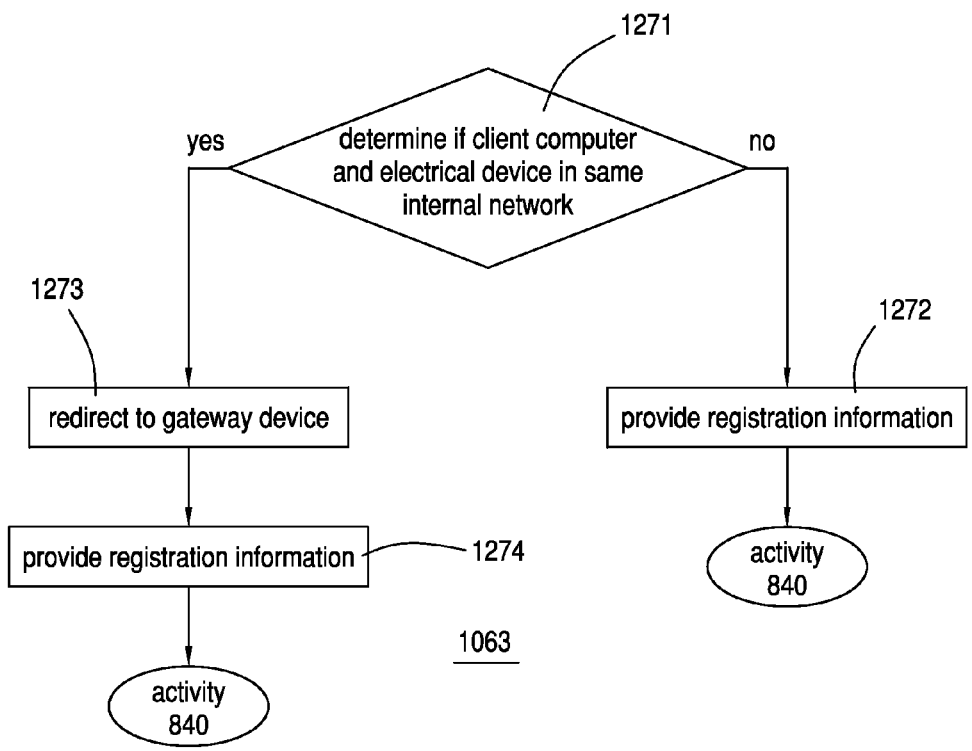
FIG. 12 illustrates a flow chart for an exemplary embodiment of a procedure of providing the requested information about the electrical device, according to the first embodiment.

Referring again to FIG. 10, activity 835 includes a procedure 1063 of providing the requested information about the electrical device. FIG. 12 illustrates a flow chart for an exemplary embodiment of procedure 1063 of providing the requested information about the electrical device, according to the first embodiment. In some examples, a return module (e.g., return module 774 of FIG. 7) can perform at least part of procedure 1063.

Referring to FIG. 12, procedure 1063 includes a process 1271 of determining if the client computer and the electrical device are in the same local network. Depending on whether the client computer and the electrical device are in the same internal network, different information may be provided to the client computer and may be provided by a different entity (e.g., registration server 190 or gateway device 150). In some examples, the external IP address of the client computer and the electrical device can be compared to determine if the client computer and the electrical device are in the same local network. In other embodiments, other mechanism can be used to determine if the client computer and the electrical device are in the same local network.

If the external IP addresses are the same, the registration server can conclude that the client computer and the electrical device are in the same local network, and the next process in procedure 1063 of FIG. 12 is process 1273. If the external IP addresses of the electrical device and the client computer are different, the next process in procedure 1063 of FIG. 12 is process 1272.

Process 1272 provides the registration information. In some examples, if the client computer and the electrical device are not in the same local network, the registration server can return the external IP address of the electrical device (e.g., electrical device 110) to the client computer (e.g., external client computer 131). After providing the registration information in process 1272, procedure 1063 and activity 835 (FIGS. 8 and 10) are complete.

Process 1273 redirects the request for the information about the electrical device to the gateway device. In many examples, the registration server can redirect a request for the information about the electrical device to a gateway device if an external IP address of the client computer is the same as the external IP address of the electrical device. The gateway device can then provide the internal IP address. In other embodiments, the registration server can provide the information and process 1273 is unnecessary.

Subsequently, procedure 1063 of FIG. 12 includes a process 1274 of providing the registration information. In some examples, if the client computer and the electrical device are in the same internal network, the gateway device can return the internal IP address of the electrical device to the client computer (e.g., internal client computer 130). After process 1274, procedure 1063 and activity 835 (FIGS. 8 and 10) are complete.

Referring back to FIG. 8, method 800 continues with an activity 840 of accessing the electrical device from a client computer. In some examples, the client computer can use at least one of the internal IP address or the external IP address of the electrical device to access the electrical device.

Although the invention has been described with reference to specific embodiments, it will be understood by those skilled in the art that various changes may be made without departing from the spirit or scope of the invention. Accordingly, the disclosure of embodiments of the invention is intended to be illustrative of the scope of the invention and is not intended to be limiting. It is intended that the scope of the invention shall be limited only to the extent required by the appended claims. For example, activities 810, 815, 820, 825, 830, 835 and 840 of FIG. 8, procedures 905, 915, and 925 of FIG. 9, procedures 1060, 1061, 1062, and 1063, processes 1171, 1172, 1173, 1174, and 1175, and processes 1271, 1272, 1273, and 1274 may be comprised of many different activities and procedures and be performed by many different modules, in many different orders, that any element of FIG. 1 may be modified, and that the foregoing discussion of certain of these embodiments does not necessarily represent a complete description of all possible embodiments.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A method of distributing information regarding one or more electrical devices using a first server, each of the one or more electrical devices has unique identification information, an internal IP address, and an external IP address, the method comprising:

receiving in the first server a first request to register a first electrical device of the one or more electrical devices, the first request to register comprises the unique identification information, the internal IP address, and the external IP address of the first electrical device of the one or more electrical devices;

storing in the first server the unique identification information, the internal IP address, and the external IP address of the first electrical device of the one or more electrical devices;
receiving in the first server from a first client computer a first request for the information regarding the first electrical device of the one or more electrical devices;
requesting first authentication information from the first client computer;
authenticating the first client computer based on the first authentication information before redirecting the first request for the information or returning the external IP address of the first electrical device of the one or more electrical device;
using the first server to determine the external IP address of the first electrical device of the one or more electrical devices;
redirecting the first request for the information to a first gateway device if an external IP address of the first client computer is identical to the external IP address of the first electrical device of the one or more electrical devices; and
returning the external IP address of the first electrical device of the one or more electrical devices if the external IP address of the first client computer is different from the external IP address of the first electrical device of the one or more electrical devices,
wherein:
the first gateway device is different from the first server; and
the first gateway device and the first electrical device are not using an UPnP (universal plug and play) standard;
receiving in the first server the first request to register the first electrical device of the one or more electrical devices further comprises:
receiving second authentication information from the first electrical device of the one or more electrical devices;
the first authentication information comprises a first username and a first password;
the second authentication information comprises a second username and a second password; and
authenticating the first client computer comprises:
authenticating the first client computer unless the first username and the first password of the first authentication information are different from the second username and the second password of the second authentication information.

2. The method of claim 1, further comprising:
using the first gateway device to return the internal IP address of the first electrical device of the one or more electrical devices if the external IP address of the first client computer is identical to the external IP address of the first electrical device of the one or more electrical devices.

3. The method of claim 1, further comprising:
providing the second authentication information to a user of the first electrical device of the one or more electrical devices.

4. The method of claim 1, further comprising:
receiving a request for an IP address of the first server from the first client computer; and
providing the IP address of the first server to the first client computer.

5. The method of claim 1, wherein:
a local network comprises the first gateway device, the first client computer, and the first electrical device of the one or more electrical devices; and
the first server is not part of the local network.

6. The method of claim 1, wherein:
a local network comprises the first gateway device and the first electrical device of the one or more electrical devices; and
the first server and the first client computer are not part of the local network.

7. The method of claim 1, further comprising:
receiving a second request to register a second electrical device of the one or more electrical devices, the second request to register comprises the unique identification information, the internal IP address, and the external IP address of the second electrical device of the one or more electrical devices; and
storing in the first server the unique identification information, the internal IP address, and the external IP address of the second electrical device of the one or more electrical devices.

8. The method of claim 7, further comprising:
receiving in the first server from the first client computer a second request for the information regarding the second electrical device of the one or more electrical devices;
using the first server to determine the external IP address of the second electrical device of the one or more electrical devices;
redirecting the second request for the information to the first gateway device if the external IP address of the first client computer is identical to the external IP address of the second electrical device of the one or more electrical devices; and
returning the external IP address of the second electrical device of the one or more electrical devices if the external IP address of the first client computer is different from the external IP address of the second electrical device of the one or more electrical devices.

9. The method of claim 7, further comprising:
receiving in the first server from a second client computer a second request for the information regarding the second electrical device of the one or more electrical devices;
using the first server to determine the external IP address of the second electrical device of the one or more electrical devices;
redirecting the second request for the information to a second gateway device if an external IP address of the second client computer is identical to the external IP address of the second electrical device of the one or more electrical devices; and
returning the external IP address of the second electrical device of the one or more electrical devices if the external IP address of the second client computer is different from the external IP address of the second electrical device of the one or more electrical devices.

10. The method of claim 1, wherein:
receiving in the first server from a second client computer a second request for information regarding the first electrical device of the one or more electrical devices;
using the first server to determine the external IP address of the first electrical device of the one or more electrical devices;
redirecting the second request for the information to the first gateway device if an external IP address of the second client computer is identical to the external IP address of the first electrical device of the one or more electrical devices; and
returning the external IP address of the first electrical device of the one or more electrical devices if the external IP address of the second client computer is different from the external IP address of the first electrical device of the one or more electrical devices.

11. The method of claim 1, wherein:
the unique identification information of the first electrical device of the one or more electrical devices comprises a MAC address of the first electrical device of the one or more electrical devices.

12. The method of claim 1, wherein:
the first gateway device and the first electrical device are not using a DLNA (digital living network alliance) standard.

13. The method of claim 1, wherein:
the first gateway device and the first electrical device are not using a Bonjour protocol.

* * * * *